US012719139B2

(12) United States Patent
Furlotti et al.

(10) Patent No.: US 12,719,139 B2
(45) Date of Patent: Aug. 25, 2026

(54) METHOD AND LINE FOR FILLING CONTAINERS OF ELECTROCHEMICAL CELLS AND BATTERY PRODUCTION METHOD

(71) Applicant: I.M.A. INDUSTRIA MACCHINE AUTOMATICHE S.P.A. IN SIGLA IMA S.P.A., Ozzano dell'Emilia (IT)

(72) Inventors: Filippo Furlotti, Frazione Cazzola (IT); Lorenzo Maldarelli, Bologna (IT); Valter Monari, Castel San Pietro Terme (IT)

(73) Assignee: I.M.A. INDUSTRIA MACCHINE AUTOMATICHE S.P.A. IN SIGLA IMA S.P.A., Ozzano dell'Emilia (IT)

( * ) Notice: Subject to any disclaimer, the term of this patent is extended or adjusted under 35 U.S.C. 154(b) by 0 days.

(21) Appl. No.: 19/119,491

(22) PCT Filed: Oct. 12, 2023

(86) PCT No.: PCT/EP2023/078359
§ 371 (c)(1),
(2) Date: Apr. 9, 2025

(87) PCT Pub. No.: WO2024/079268
PCT Pub. Date: Apr. 18, 2024

(65) Prior Publication Data

US 2026/0142357 A1 May 21, 2026

(30) Foreign Application Priority Data

Oct. 14, 2022 (IT) ........................ 102022000021240

(51) Int. Cl.
*H01M 50/60* (2021.01)
*B65B 31/02* (2006.01)
(Continued)

(52) U.S. Cl.
CPC ......... *H01M 50/609* (2021.01); *B65B 31/025* (2013.01); *H01M 6/14* (2013.01); *H01M 50/645* (2021.01)

(58) Field of Classification Search
CPC .. H01M 50/60; H01M 50/618; H01M 50/609; H01M 50/645; H01M 6/14; B65B 31/02; B65B 31/025
See application file for complete search history.

(56) References Cited

U.S. PATENT DOCUMENTS 3,748,186 A * 7/1973 Rosansky ............... H01M 6/16 29/623.2
4,061,163 A * 12/1977 Decker ................... H01M 6/14 141/59

(Continued)

FOREIGN PATENT DOCUMENTS

CN 103872276 B 5/2016
DE 102022133259 A1 * 6/2024 .......... H01M 50/627

(Continued)

OTHER PUBLICATIONS

International Search Report and Written Opinion for International Patent Application No. PCT/EP2023/078359 completed on Mar. 21, 2024.

(Continued)

*Primary Examiner* — Nicolas A Arnett
(74) *Attorney, Agent, or Firm* — Carlson, Gaskey & Olds, P.C.

(57) ABSTRACT

A method of filling containers of electrochemical cells includes: filling with electrolyte a plurality of filling units, and coupling each filling unit to a respective container, thus forming a unitary assembly for transferring the electrolyte from the filling unit to the container coupled thereto. The method further includes transferring the electrolyte from the filling unit to the container coupled thereto and uncoupling (Continued)

each filling unit from the respective container. The steps of coupling and uncoupling can be performed inside a conditioned room delimited by walls that separate an inside environment from an outside environment. The pressure and/or humidity conditions of the environment inside the conditioned room being different from the outside environment. The step of transferring can occur at least partially in the outside environment.

16 Claims, 11 Drawing Sheets

(51) Int. Cl.
*H01M 50/609* (2021.01)
*H01M 6/14* (2006.01)
*H01M 50/645* (2021.01)

(56) References Cited

U.S. PATENT DOCUMENTS 4,565,750 A * 1/1986 Isoi .................... H01M 50/308 141/241
5,714,129 A * 2/1998 Nishimura ........... H01M 10/54 429/49
6,706,440 B1 * 3/2004 Takimoto ........... H01M 50/618 141/241
8,047,241 B2 * 11/2011 Reschke ............. H01M 50/627 137/260
8,910,671 B2 * 12/2014 Yamaura ............. H01M 50/673 141/8
9,065,131 B2 * 6/2015 Takada ................ H01M 50/618
9,379,409 B2 * 6/2016 Matsui ................ H01M 50/627
9,431,648 B2 * 8/2016 Thoennessen .... H01M 10/0525
12,148,958 B2 * 11/2024 Onnerud ............ H01M 50/502
2004/0103526 A1 * 6/2004 Erhardt .................... H01G 9/10 137/12
2011/0171503 A1 * 7/2011 Giroud ................ H01M 50/103 429/50

FOREIGN PATENT DOCUMENTS

JP 2001266847 A 9/2001
JP 2015133197 A 7/2015

OTHER PUBLICATIONS

Italian Search Report for Italian Patent Application No. IT102022000021240 completed on May 24, 2023.

* cited by examiner 1
117
116
10a
C
106
2
10
12
120
13
130
14
100
121
131
140
141
101
105
11a
122
104
102
132
103
142
118
109
C'
4
11
108
107
110

1
P2
12
13
10
14
11
110

22
274
27
242
2
275
273
273
241
240
26a
26b
275
26a
26b
271
271
272
3
272
32
35

22
242
25
274
273
275
2
277
241
24
271
276
23
21
21a
20
20a
272
31
30
32
C
3
35
34
33

22
242
25
274
273
275
2
277
241
24
21b
271
276
21
23
21a
20
31
32
20a
30
272
C
3
35
34
33

22
242
25
275
273
2
277
241
24
271
276
23
21
21a
20
4
31
32
20a
30
272
C
3
35
34
33

323
10,10'
ΔP2
118,118'
108,108'
107,107'
4
4
C
400
117,117'
116,116'
S1
S2
S2
ΔP3
109,109'
10a,10a'
ΔP1
119,119'
S1
ΔP3
11,11'
C'
11a,11a'
115'

METHOD AND LINE FOR FILLING CONTAINERS OF ELECTROCHEMICAL CELLS AND BATTERY PRODUCTION METHOD

The present invention relates to method and line for filling containers of electrochemical cells with electrolyte and a battery production method.

Although the invention is particularly adapted to the production of batteries (primary or secondary) of the cylindrical-cell type, for example lithium ion batteries, the invention is in any case adapted to the production of other electrolytic or electrochemical cells or other forms of cell packaging, for example prismatic cells or pouch cells, which necessitate a dry environment for their manufacture.

Battery production lines, for example for producing lithium ion batteries, require that at least some of the processing steps take place in a “dry room”, i.e. a sealed and ultra-dry room, i.e. with an extremely low rate of controlled humidity (typically of the order of 1% by volume) and with a dew point that can be lower than −40° C. This occurs, in particular, in those cases in which the materials of the electrodes and/or the electrolytes that fill the battery are sensitive to humidity, i.e. they react with water.

The volume of the dry room that accommodates the production line is typically of the order of 10,000-20,000 cubic meters and requires a very high expenditure of energy (of the order of 500 kW or even higher) for the generation and recirculation of the air streams and their cooling, drying and heating.

Furthermore, the workers who enter such dry environments need to adopt specific precautions (essentially, their clothing and the length of time they are permitted to stay) in order to prevent health problems, for example with eyes and skin.

Another drawback of conventional battery production lines is that certain materials (for example zinc, copper and/or nickel) cannot be used as the principal materials in components of the machines that form the line, as their dust can interfere with the electrolyte or the electrodes. It is therefore necessary to design or redesign the machines, in particular the machines that are located inside the dry room, so that the corresponding components are made of materials other than those that cannot be used, i.e. materials that are compatible with the manufacture of batteries.

Another not insignificant problem is associated with the cleaning of conventional dry rooms, which requires a significant expenditure of time and electricity to restore the ultra-dry condition.

The aim of the present invention is to provide a battery production method and production line, as well as an associated electrolyte filling method and filling station, that are capable of improving the known art in one or more of the above mentioned aspects.

Within this aim, an object of the invention is to reduce the expenditure of energy deriving from the use of the dry room for the production of batteries.

Another object of the invention is to eliminate or in any case reduce the risks to health of the workers who operate on a battery production line that requires a dry room.

Another object is to reduce the complexity associated with air recirculation systems and to reduce the time required to restore the ultra-dry environment.

Another object is to enable the use of components made mainly of materials that are normally not allowed in machines for battery production, for example zinc, copper and/or nickel.

Furthermore, another object of the present invention is to overcome the drawbacks of the known art in an alternative manner to any existing solutions.

Another object of the invention is to provide a battery production method and production line, as well as a filling method for battery production lines, which are highly reliable, easy to implement and of low cost.

This aim and these and other objects which will become better apparent hereinafter are achieved by a method of filling containers of electrochemical cells with electrolyte according to claim 1, optionally provided with one or more of the characteristics of the dependent claims.

The aim and the objects of the invention are likewise achieved by a method for producing batteries according to claim 14.

The aim and the objects of the invention are likewise achieved by a filling line according to claim 15, optionally provided with one or more of the characteristics of the dependent claims.

Further characteristics and advantages of the invention will become better apparent from the description of preferred, but not exclusive, embodiments of the invention, illustrated by way of non-limiting example in the accompanying drawings wherein.

Figure 1:
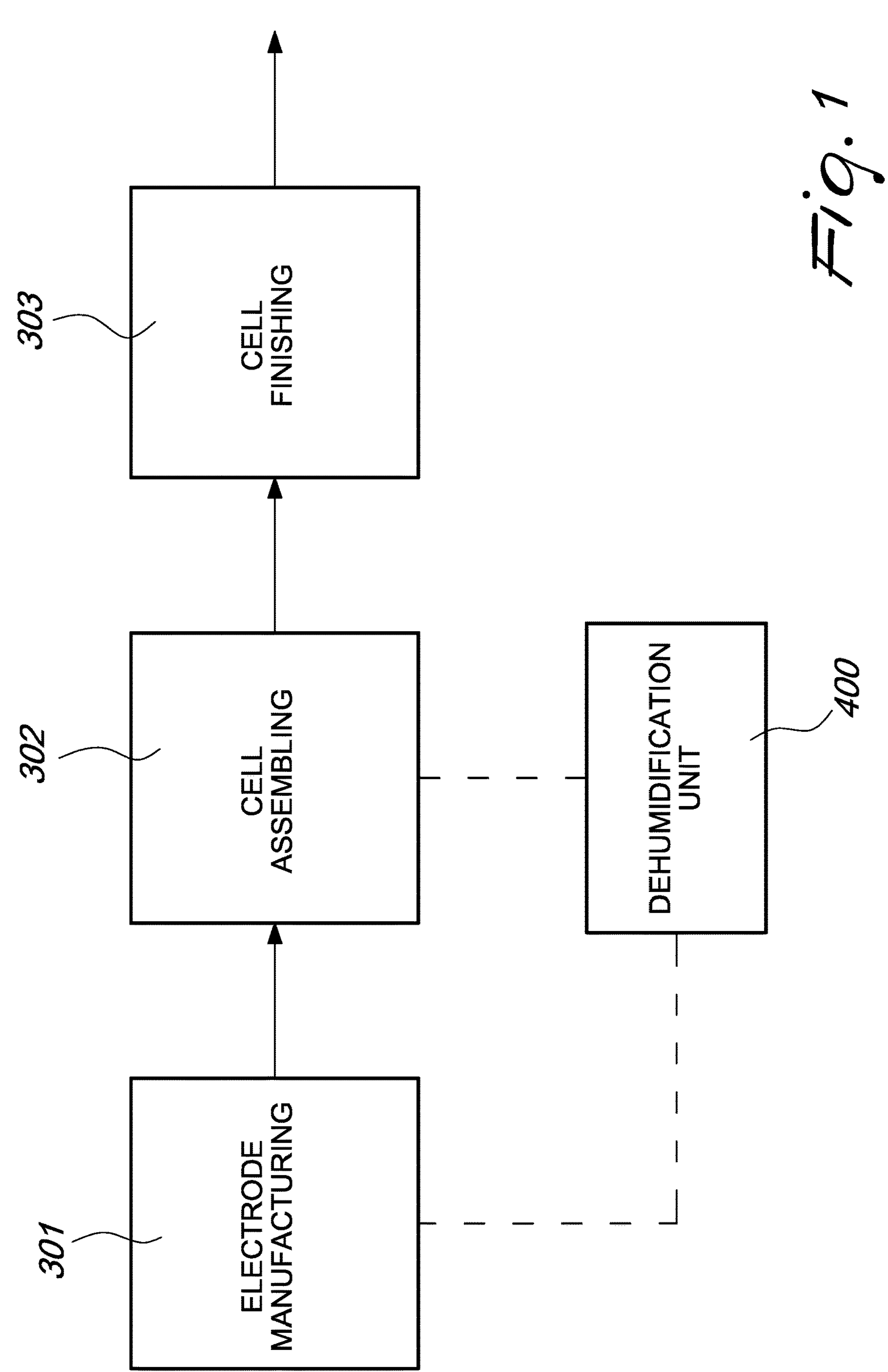
FIG. 1 is a block diagram of a battery production line according to the invention.
Figure 2:
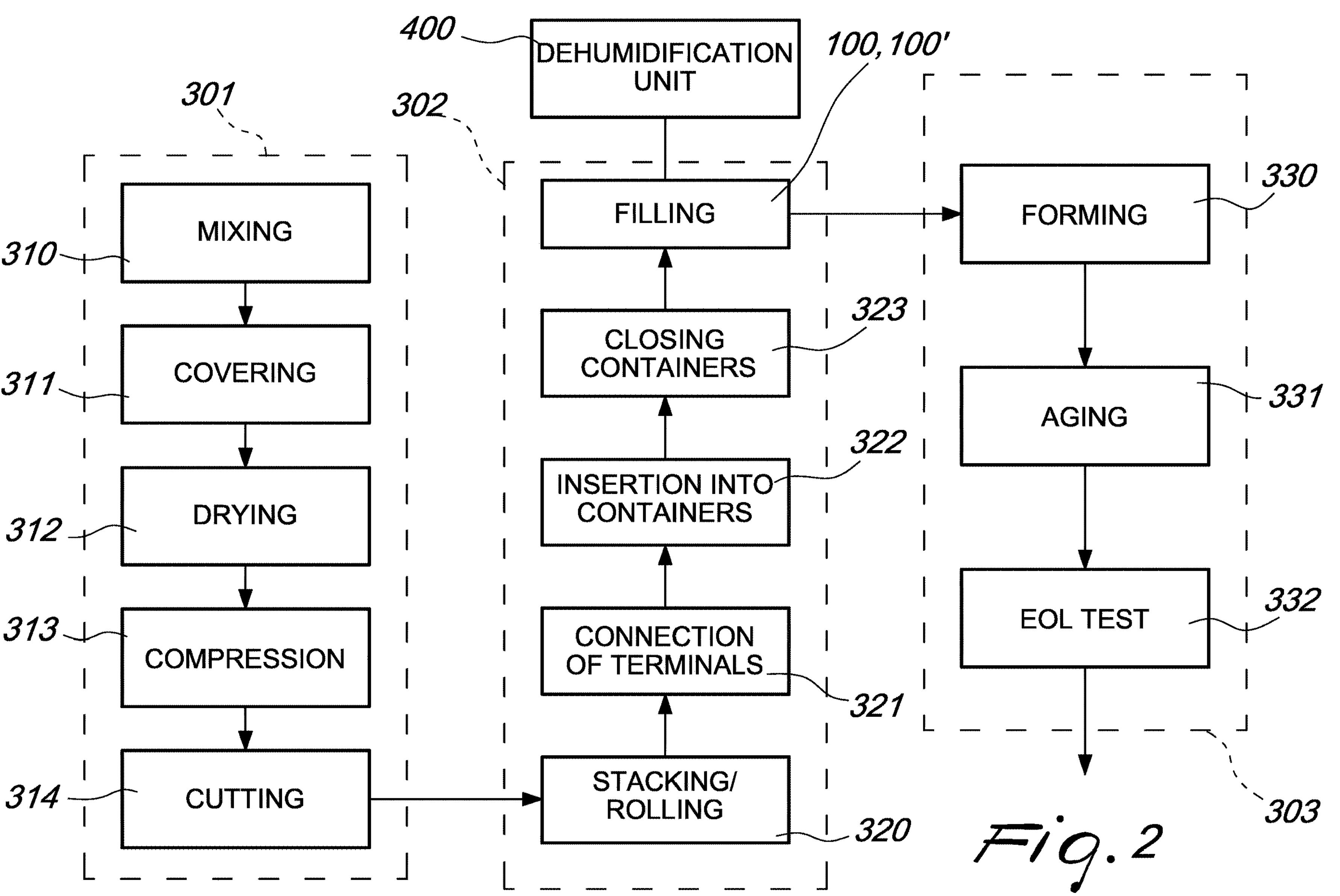
FIG. 2 is a block diagram of the machinery of the production line of the previous figure.
Figure 3:
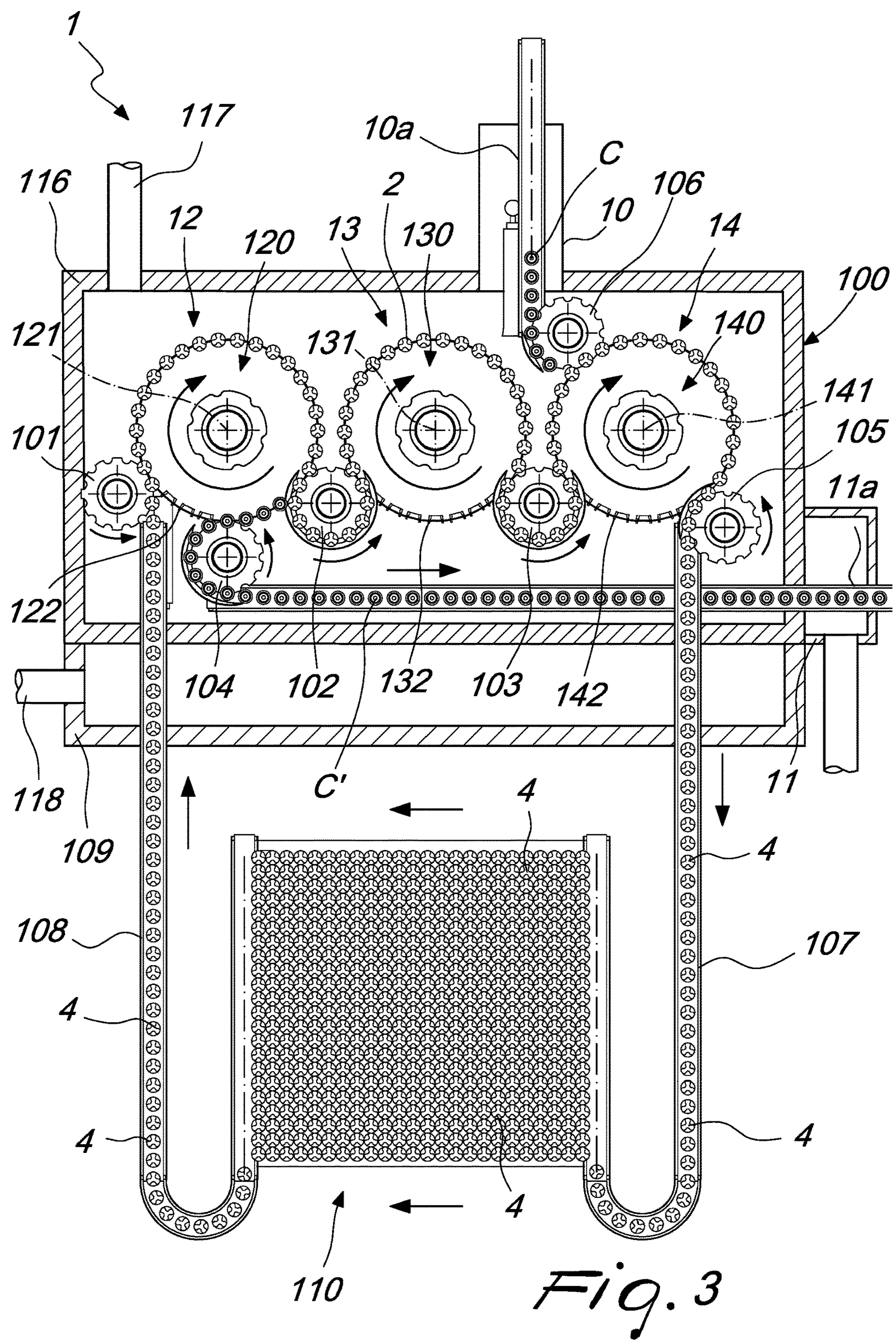
FIG. 3 is a plan view of a filling apparatus according to a first embodiment of the invention.
Figure 4A:
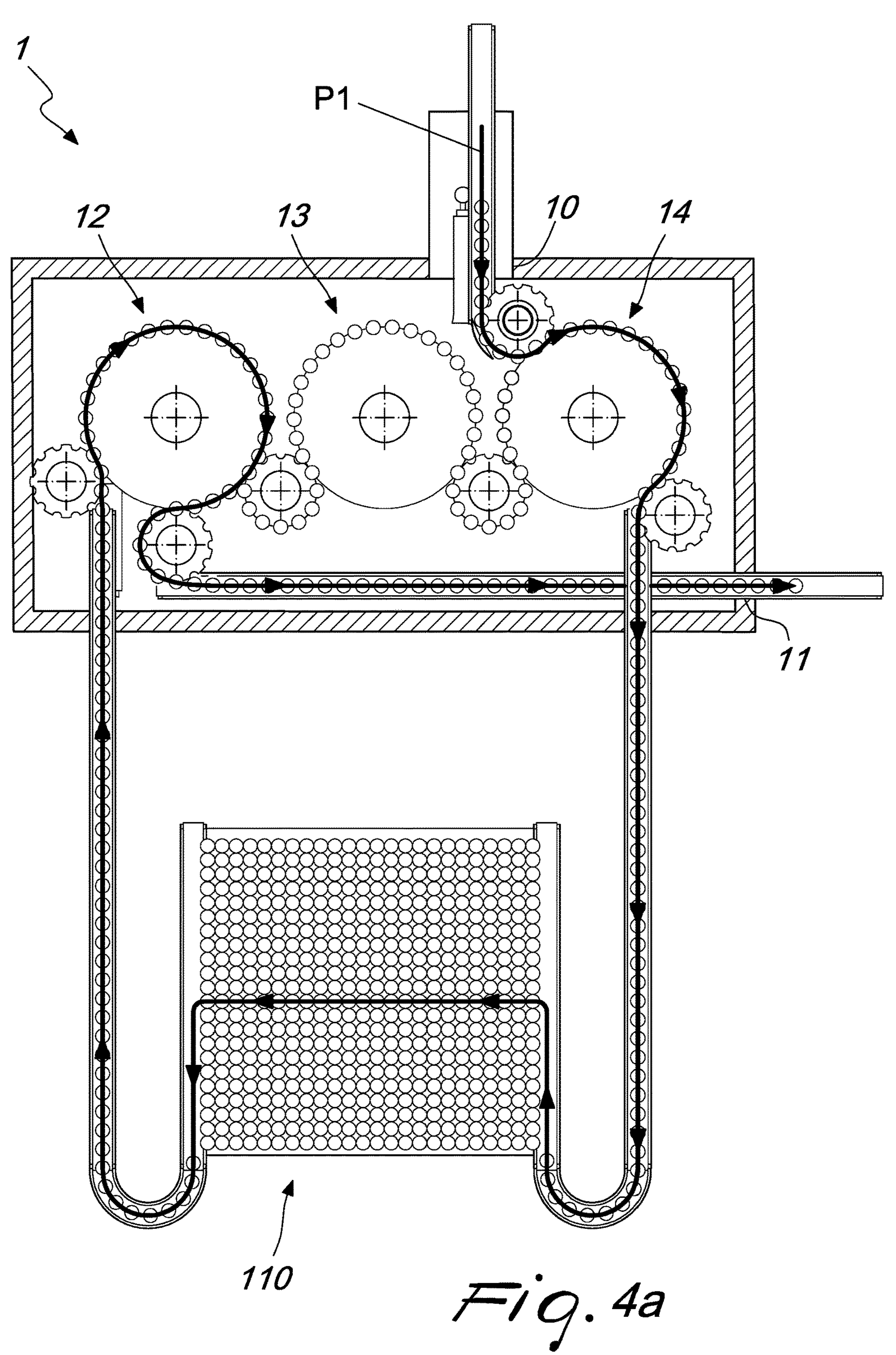
Figure 4B:
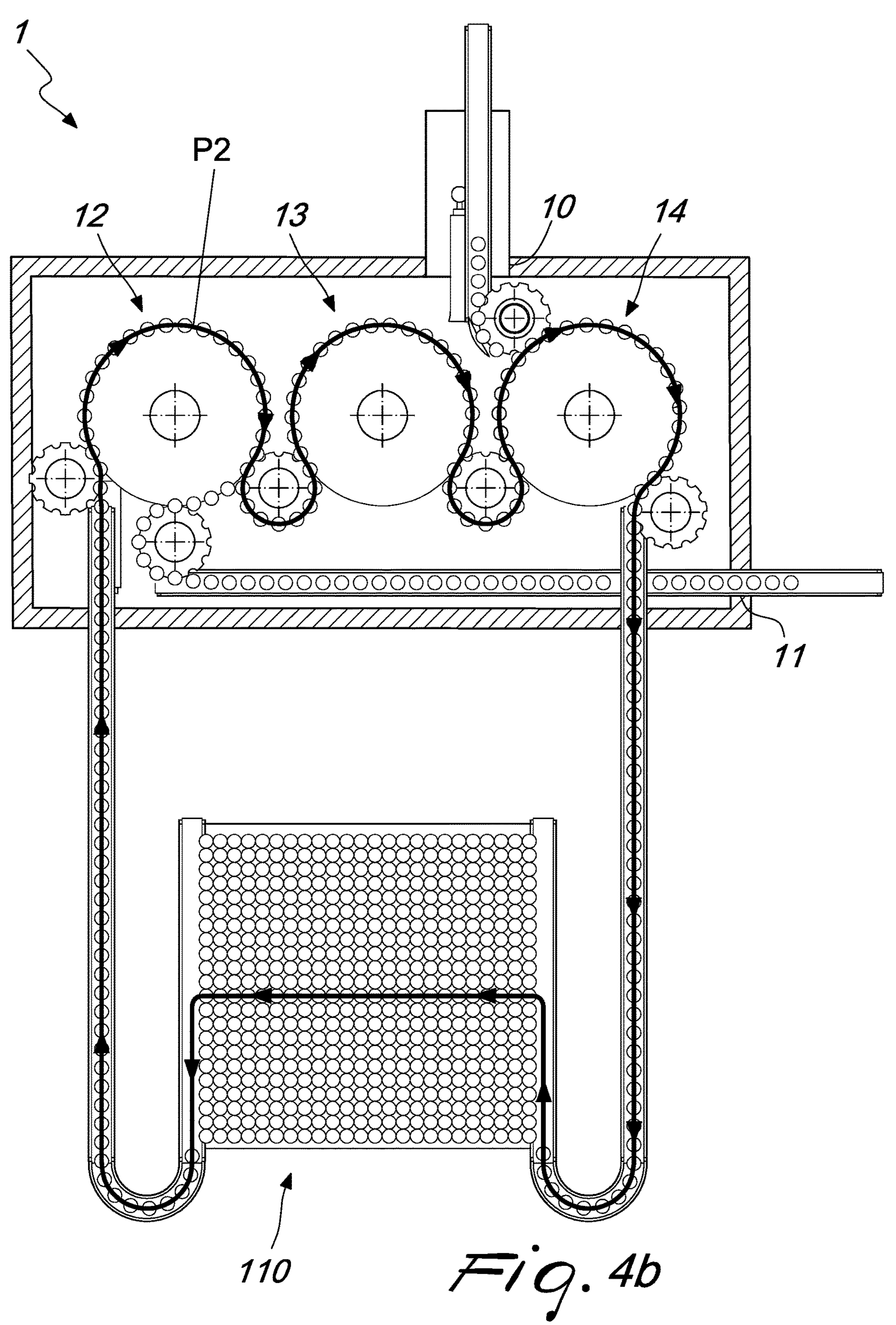
Figure 5:
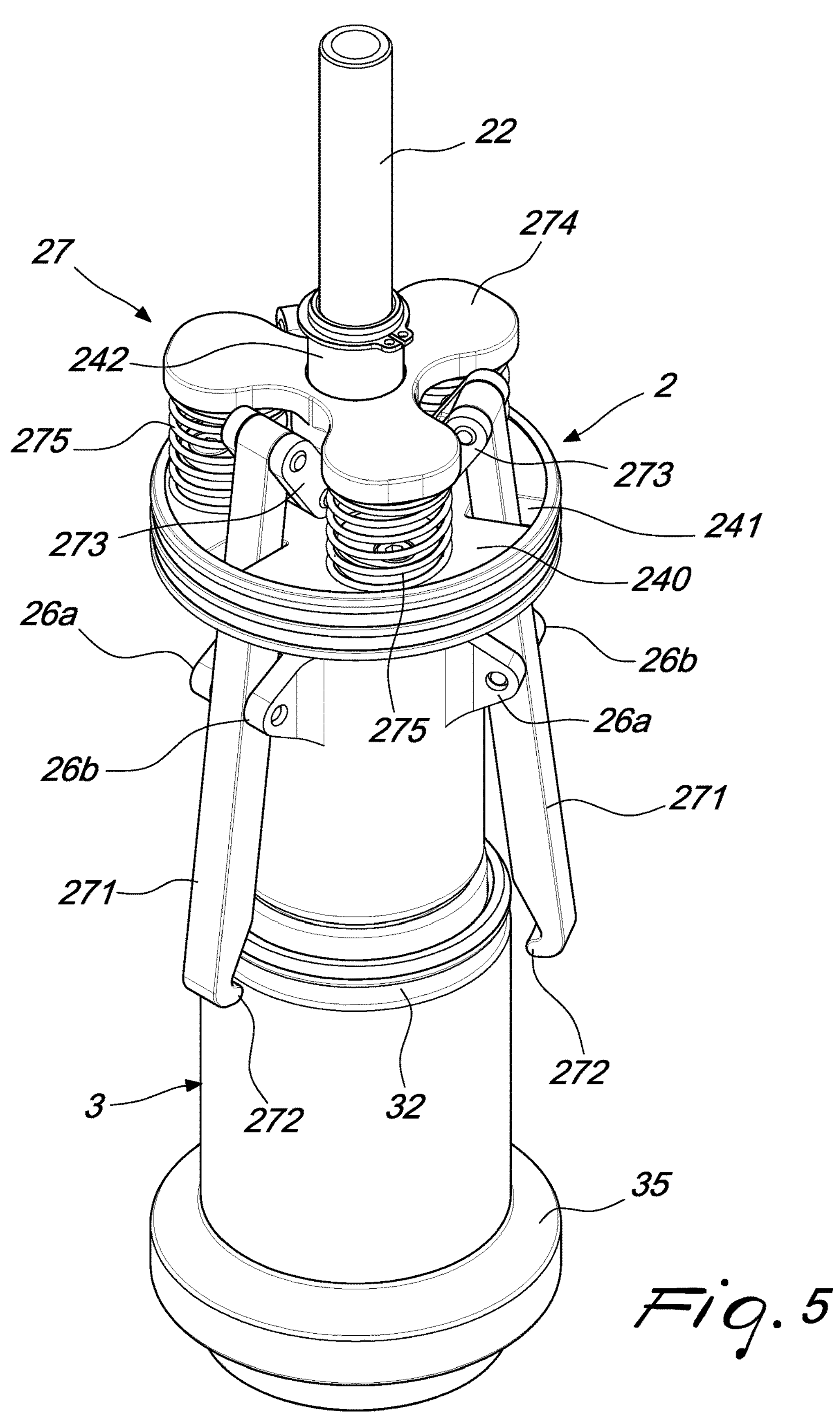
Figure 6:
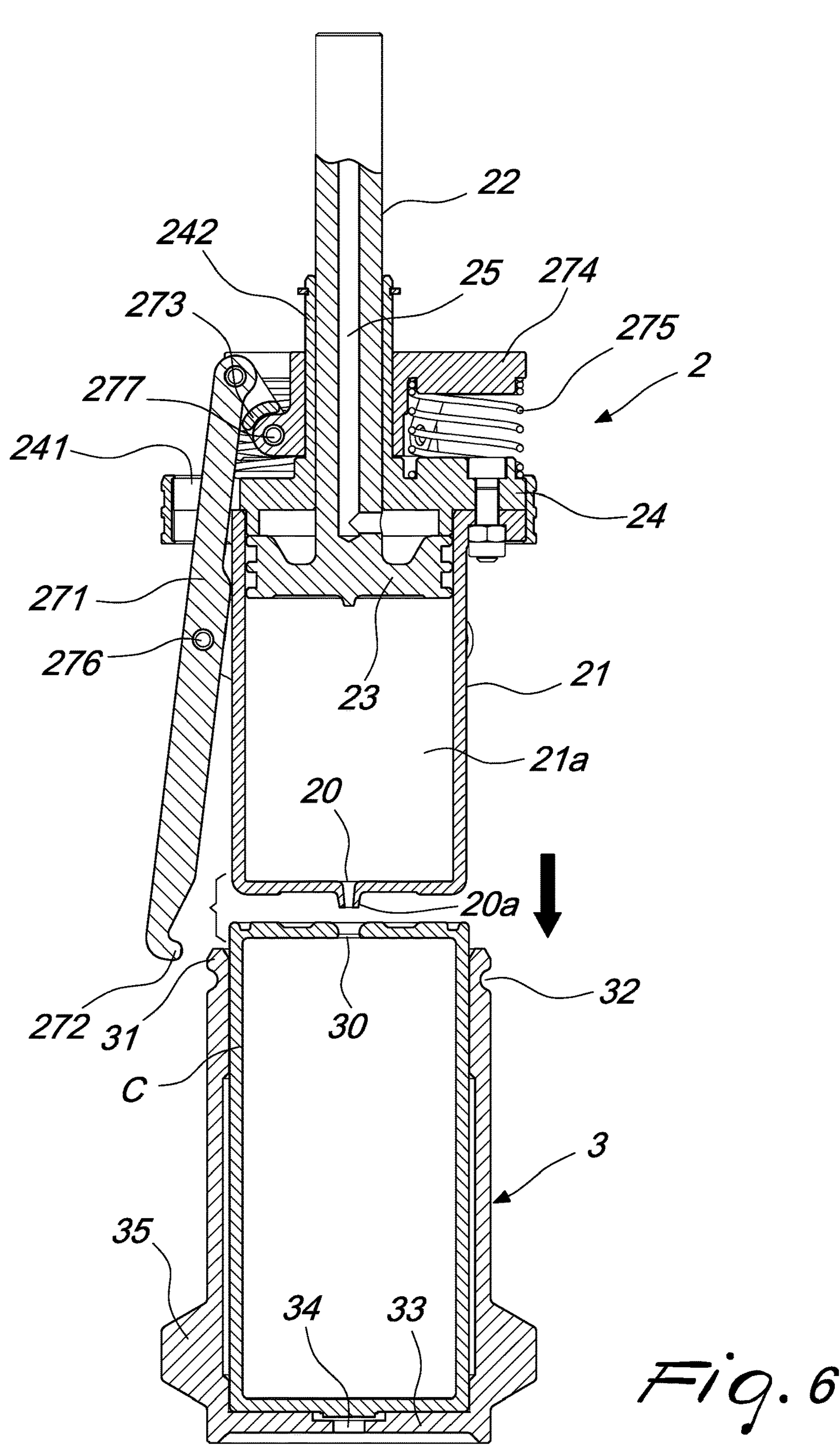
Figure 7:
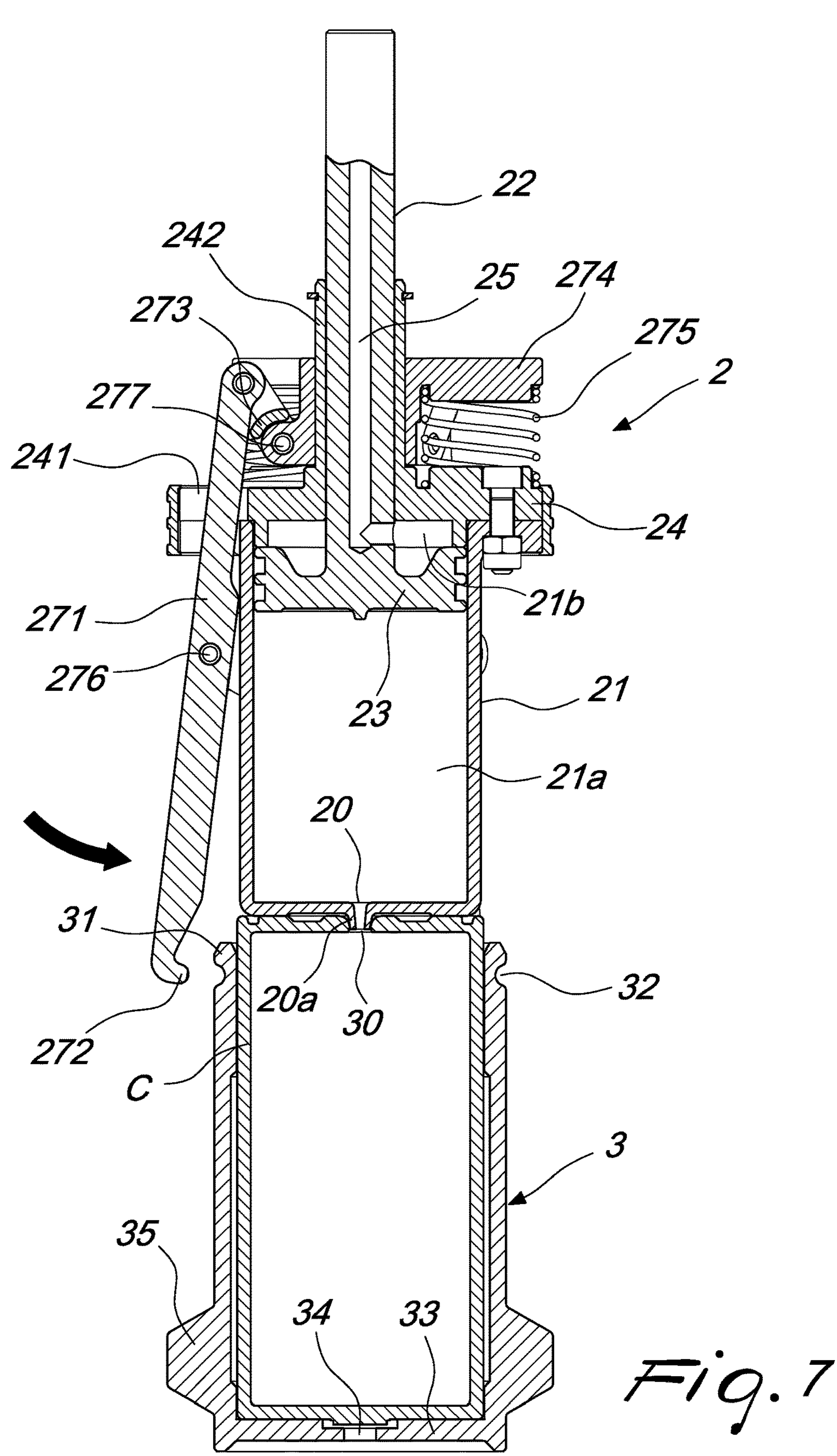
Figure 8:
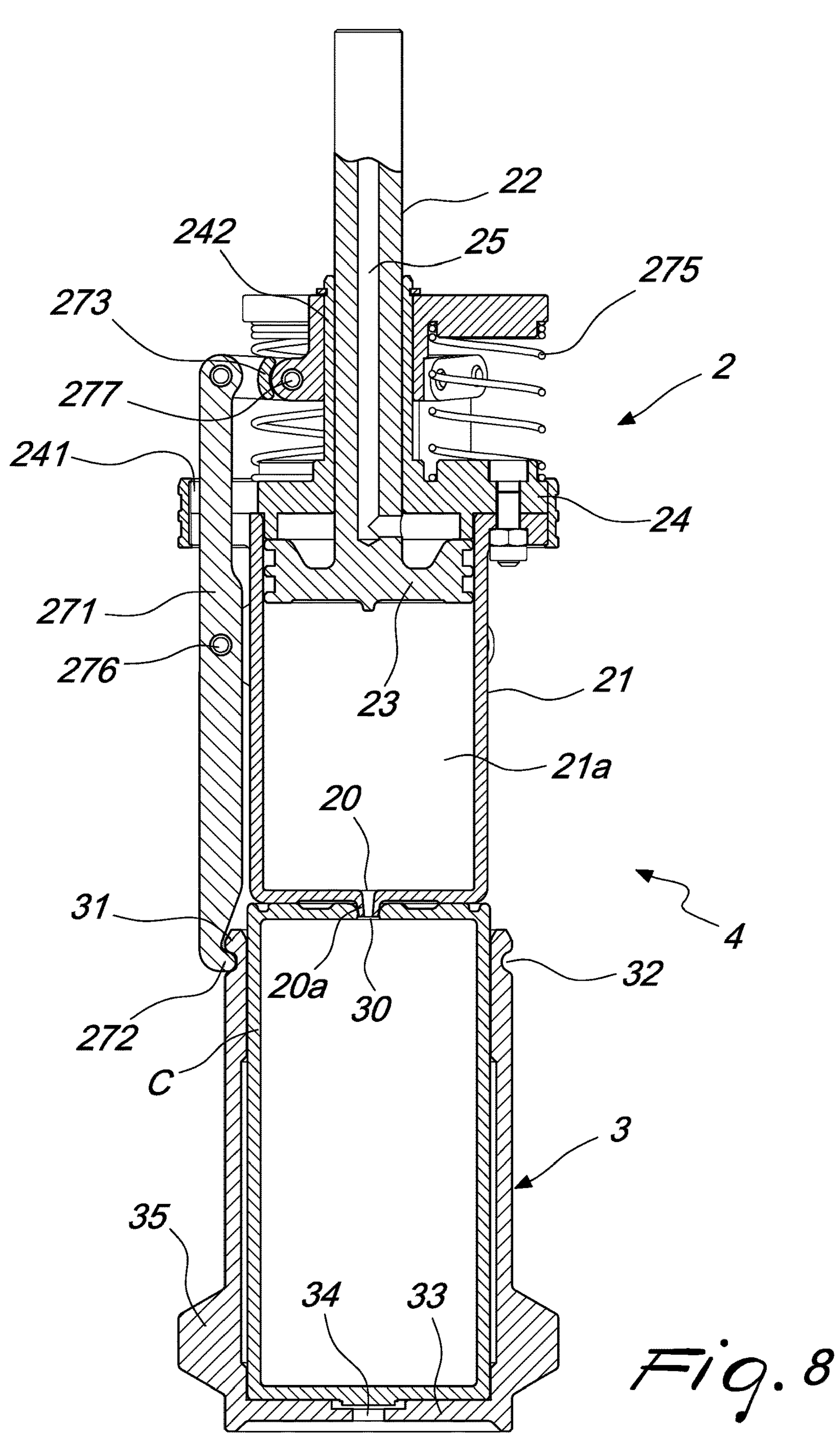
Figure 9:
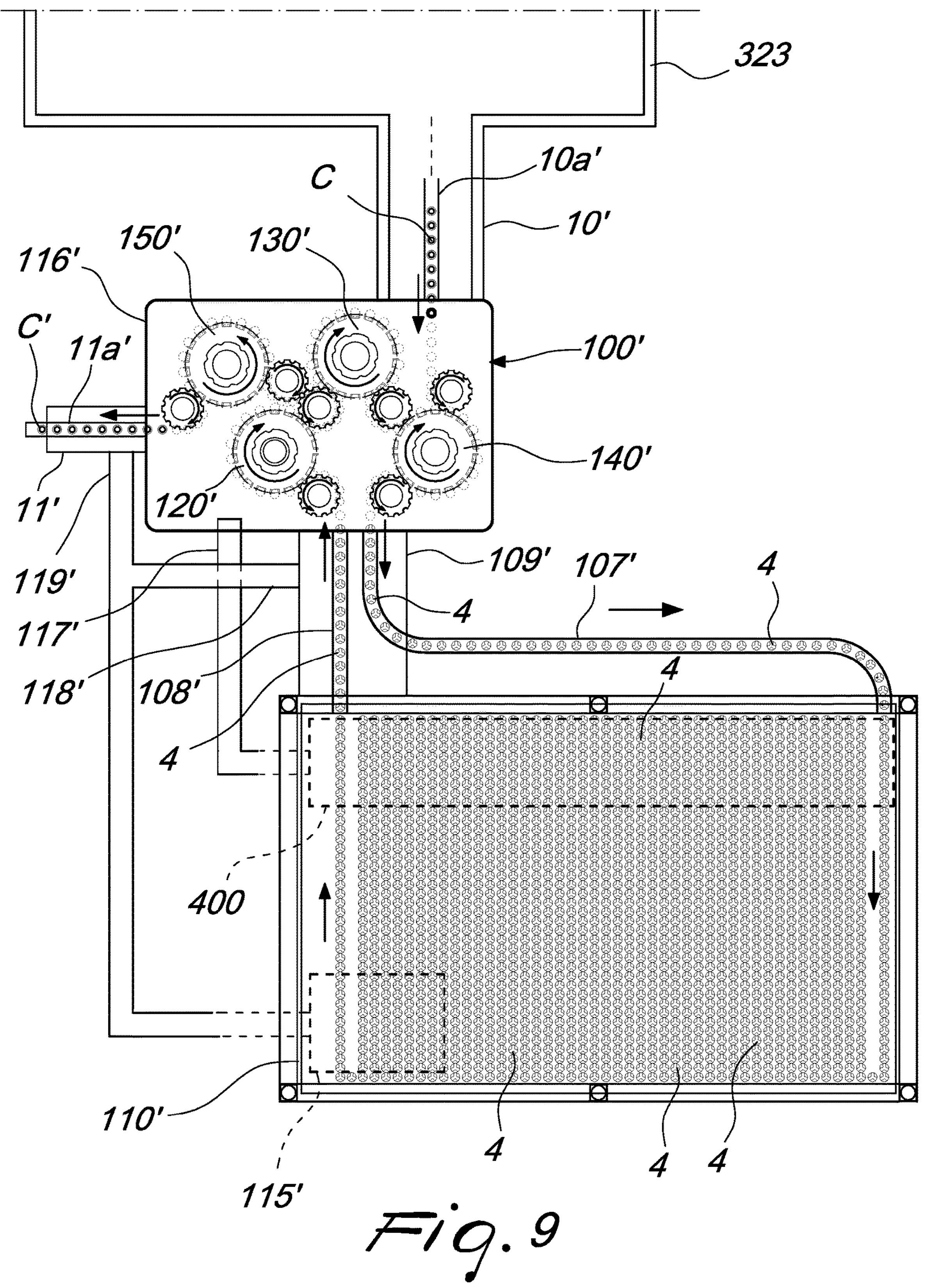
Figure 10:
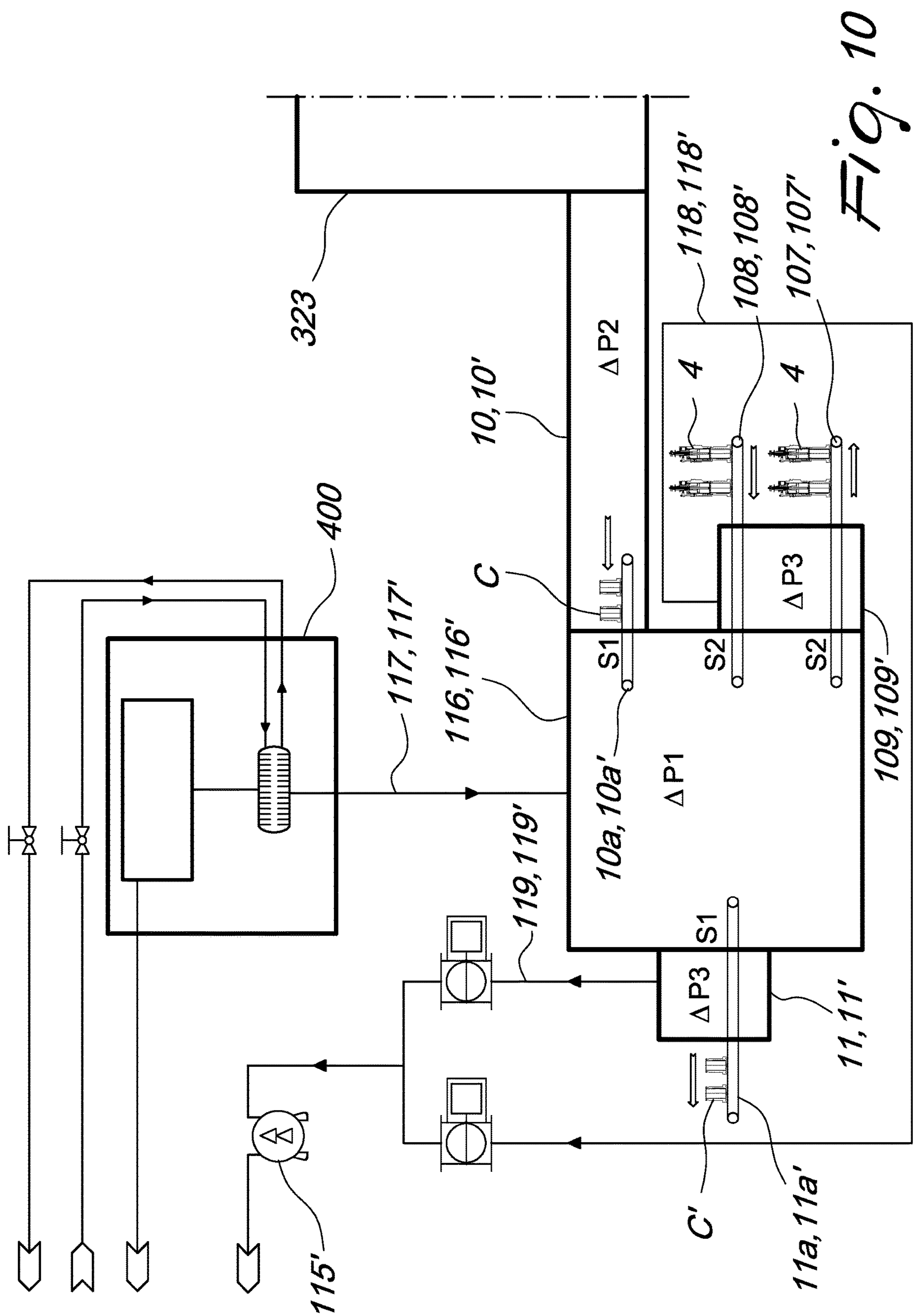

FIGS. 4*a*-4*b* show respectively the path of the containers and the path of the filling units in the station of the previous figure;

FIG. 5 is a perspective view of a filling kit used in the filling apparatuses according to the invention;

FIG. 6 is an axial cross-sectional view of the kit of the previous figure;

FIG. 7 corresponds to the previous figure but with the filling unit while it is being fixed to the puck that accommodates the container;

FIG. 8 corresponds to the previous figure but with the fixing means activated to form a unitary assembly;

FIG. 9 is a plan view of a filling apparatus according to a second embodiment of the invention;

FIG. 10 is a P&ID diagram of the previous figure, which can also be applied to the first embodiment of the filling apparatus.

With reference to the figures, a battery production line according to the invention, generally designated by the reference numeral 1, generally comprises an assembly 301 for manufacturing electrodes, an assembly 302 for assembling cells and an optional assembly 303 for finishing cells, which can however be separate from the line 1.

The line 1 is preferably an at least partially continuous production line and is particularly adapted to the production of batteries of the cylindrical-cell type, for example lithium ion batteries. However, the electrochemical cells that can be manufactured with the line 1 can also be prismatic, pouch, or button cells.

In the discussion below reference will be made, for the sake of simplicity, to the production of single cylindrical cells.

Each assembly 301, 302, 303 comprises one or more processing stations, each one consisting of an apparatus adapted to perform one or more operations on one or more elements that will go to make up the final cell or, in the case of the assembly 303 for finishing cells, on the final cell. A dehumidification unit 400 is associated with at least one of such processing stations.

In particular, the assembly 301 for manufacturing electrodes can comprise:

- a mixing station 310, adapted to perform a step of mixing the raw materials of the electrodes (for example, materials based on graphite for the anode and, separately, materials based on the lithium oxide of a metal for the cathode) with a conductive binder to form mixture with a solvent;
- a covering station 311, adapted to perform a step of covering, with the mixtures obtained from the station 310, respective sheets of anode and of cathode, the function of which is to act as a current collector;
- a drying station 312 which receives the covered sheets from the station 311 and performs the evaporation of the solvent of the mixtures;
- a compression station 313, adapted to perform a compression operation (for example, via calendering) of the dried sheets arriving from the station 312;
- an optional cutting or "slitting" station 314, for cutting the sheets of electrode arriving from the compression station 313 into narrower strips, which will become the electrodes of the cell.

The assembly 302 for assembling cells can comprise:

- a stacking station (if the production line is for pouch cells) or a winding station 320 (if the production line is for cylindrical or prismatic cells) for stacking the strips of cathode and anode arriving from the assembly 301 for manufacturing electrodes, in order to obtain a stack (called just a "stack") or a roll (called a "jelly roll") in which separator layers are interposed between the layers of cathode and anode;
- a station 321 for connecting contact terminals or tabs to the electrodes (stacked or rolled) arriving from the previous station, for example using laser welding or ultrasound welding;
- a station 322 for inserting the electrodes (stacked or rolled) into respective casings (pouch, cylindrical or prismatic, on the basis of the type of cell to be produced). For cylindrical cells, the casing is substantially a cylindrical can, open at the insertion end. The casings can optionally be accommodated in respective transport pucks in the station 322 and/or in the stations downstream, as better described below;
- a station 323 for closing the casings, in which the cell casings containing the electrodes (stacked or rolled) and arriving from the station 322 are sealed with a cap, thus obtaining a container C. However, an inlet is preferably left on the closing cap, in order to allow the subsequent filling of the container C with an electrolyte;
- an apparatus 100 or 100' for filling the containers C with an electrolyte, which is typically in liquid or gel form. For example, for lithium ion batteries, the electrolyte can consist of lithium salts dissolved in a non-aqueous organic solvent and with optional additives, or it can be another fluid or gel that is normally used as an electrolyte in this type of battery. The filling apparatus can comprise or be followed by an apparatus for sealing the filled containers C', which is adapted to seal (for example with a plug) the inlet used to fill the container C with the electrolyte, and thus complete the cell.

The finishing assembly 303, which can optionally be separate from the line 1, can comprise:

- a forming station 330, in which steps of charging and discharging the cell are performed, in particular according to predefined voltage and current curves;
- an aging station 331, in which the cells arriving from the forming station are stored and monitored for a certain period, for example by periodically measuring the open-circuit voltage, optionally at different temperatures;
- an end-of-line or EOL testing station 332 in which the cells stored in the aging station are further checked (for example, for any losses).

According to an aspect of the invention, one or more of the processing stations that perform steps of the production process in which an ultra-dry environment is required, such as stations of the filling apparatus, comprise walls that enclose a space so as to form an environmentally conditioned room, more particularly a dry room, which is advantageously kept at a higher pressure than the outside environment via the injection of ultra-dry air originating from the dehumidification unit 400 which is connected, and optionally dedicated, to that processing station.

The side walls of the conditioned room or, more specifically, of the dry room are advantageously fixed to a supporting frame, to a footing or to a table of the apparatus that constitutes the processing station(s) or which forms part of it/them, such as the supporting frame, the footing or the table of the filling apparatus.

With a dedicated dry room, which advantageously forms a single block with the respective filling apparatus, the volume of the space in which to drastically lower the humidity is thus minimized, and can be for example less than 20 cubic meters (for example between 5 and 15 cubic meters) with consequent great savings of electricity to maintain an ultra-dry environment in such room. The operations to clean and restore the ultra-dry environment are also considerably reduced and simplified by this reduced volume.

With the higher pressure that is continuously maintained in such a dedicated dry room, it is possible to prevent the entry of contaminants and of humidity into the dry room even though there is, on at least one of the walls of the dry room, one or more passage openings which are adapted to be passed through in entry and/or in exit, continuously or otherwise, by the products that are processed in the ultra-dry environment at that processing station.

By confining the space in which the ultra-dry environment is required, the workers can operate freely along the battery production line 1 without the special contrivances required by conventional dry rooms and without running the associated risks, since during the operation of the line 1 the workers will always operate outside the stations that are fitted with a respective dry room.

The apparatus fitted with the dry room can optionally be designed so that the components made mainly of materials that are incompatible with battery production or with the processing performed by that apparatus are left outside its dry room, while remaining within the apparatus. For example, motors, with their copper windings, can be positioned outside the dry room and connected via gear transmissions to the moving parts that manipulate or convey the products inside the dry room.

In the preferred embodiments of the invention, the conditioned room 116 (or 116', based on the embodiment shown in the figures) is a dry room and is integrated in the stations involved in the filling of the containers C with electrolyte. The conditioned room 116, 116' is defined or delimited by walls (sealed against humidity), which separate an environment inside the conditioned room from an environment outside the conditioned room. The pressure and/or humidity conditions of the environment inside the conditioned room (116, 116') is/are different from the outside environment.

The walls delimiting the conditioned room 116, 116' enclose (laterally, above and below) at least some of the operating parts of the filling apparatus 100, 100' (such as those performing the filling of the filling units and the coupling and uncoupling steps described hereinafter), so as to be able to maintain a given higher pressure ΔP1 in the room 116, 116' with respect to the pressure of the outside of the environment (i.e. a slight overpressure), in particular higher than the atmospheric pressure. This preset higher pressure ΔP1 is adapted to prevent the entry of contaminants and of humidity into the room 116, 116' and can be comprised between 10 and 20 pascals, for example 15 pascals.

The filling apparatus 100, 100' comprises a first path P1 for conveying a series of containers C to be filled which arrive from the stations 322 or 323 and which, as mentioned previously, are preferably casings closed by a cover and contain the electrodes of the battery, for example in the form of rolls or "jelly rolls". The containers C are conveyed, preferably with continuous motion, from an entrance 10, 10', through which containers C to be filled enter the apparatus 100, 100', to an exit 11, 11', through which containers C that have been filled (the filled containers are here also indicated with C') with a predetermined volume of electrolyte exit from said station.

The entrance 10, 10' and the exit 11, 11' are preferably in the form of tunnels and communicate with passage openings which are present on the walls of the conditioned room 116, 116' and which have an area S1 that is preferably the minimum necessary to allow the transit of the containers C or C' and the passage of linear conveyors 10*a*, 10*a'* and 11*a*, 11*a'* for the containers (for example belt, chain, roller, or screw feeder conveyors).

The entrance tunnel 10, 10' and/or the exit tunnel 11, 11' can also be kept at extremely low humidity levels, for example because they are connected to other dry rooms in other stations, or groups of stations, for processing upstream and/or downstream of the filling apparatus 100, 100'.

Considering that the container C has its internal volume mostly taken up by electrodes, for example in "jelly roll" form, these obstruct what would otherwise be a faster introduction of the electrolyte into the container C, and they make it preferable to use the solution involving a buffer station 110, 110', which is described below.

The container C can have a cylindrical shape with a circular base, as in the case shown in the drawings, or a prismatic shape, a pouch shape or a button shape.

In the preferred embodiments of the invention, each container C along at least the first path P1 is advantageously accommodated in a respective transport puck 3, which is a beaker-like body that is open above at a rim 31 thereof so as to allow the container C to be slid (automatically) into the puck through the rim 31, leaving an upper inlet 30 thereof exposed, and to be stabilized during the various operations along all of the first conveyance path P1' and optionally along the paths upstream and/or downstream of the filling apparatus 100, 100'.

The puck 3 is preferably suitable to remain integral with the container C at least along all of the first path P1, by interference-fit coupling and/or by form-fit coupling with the external surface of the container C, but leaving preferably at least one lateral interspace 36 in order to allow the creation of a vacuum in the container C before its filling and/or in order to allow the washing of the container C before and/or after it is filled with the electrolyte. For example, the puck 3 can also have a substantially cylindrical shape. The puck 3 can be, for example, a bucket or a pail.

The puck 3 can have on its lateral surface a fixing surface, for example in the form of at least one depression 32 which, in the embodiment illustrated, is coaxial with the central axis of the puck and advantageously annular. The fixing surface 32 is preferably arranged proximate to the upper rim 31 of the puck 3.

On the end axially opposite to the rim 31 the puck 3 has a base 33 which is suitable to give internal support to the container C and/or in any case to provide a resting surface outward, used for conveying the puck—and therefore the container C—along at least the first conveyance path P1 or some sections thereof. The base 33 can have at least one through hole 34, for example in the center, to provide an optional inlet for washing the container C after it is filled, or an optional vent during the insertion/removal of the container C with respect to the puck 3 and/or during the creation of a vacuum in the container C before it is filled, described below.

The lateral surface of the puck 3 can have an enlarged radial portion 35 which substantially acts as a radial spacer when the pucks are side-by-side, in particular on the buffer station 110, 110' (described below) associated with the filling apparatus 100, 100' and preferably outside it.

The filling apparatus 100, 100' also comprises a second path P2 for conveying a series of filling units 2. The filling units 2 are substantially syringe-like units that can move along the second path P2, which is preferably a closed path. The second path P2 is at least partially superimposed on the first conveyance path P1 so that, in the superimposed portions, the filling units 2 and the respective containers C are mutually superimposed in an axial direction, i.e. parallel to a (vertical) direction that is substantially perpendicular to the floor on which the filling apparatus 100 or 100' is installed. The filling units 2 are conveyed, preferably, with continuous motion, along at least some of the second path P2.

Each filling unit 2 substantially comprises a syringe-like unit, provided with a reservoir 21 which is adapted to contain, in an internal first chamber 21*a* thereof, the predetermined volume of electrolyte to be transferred to a respective container C. To this end, this reservoir 21 comprises a bottom opening 20 for the passage of the electrolyte, which can, although not necessarily, have a diameter in the order of a few millimeters (for example 2-3 mm) and which can advantageously be connected to the upper inlet 30 of the respective container C, for example by making the opening 20 with a spout 20*a* protruding outward from the reservoir 21.

The reservoir 21 is associated with a plunger 22, which can move axially with respect to the reservoir 21 by way of a guide body 24 which is fixed to the reservoir 21, for example, by means of a flanged coupling as in the embodiment shown. In particular, the guide body 24 of the plunger 22 is provided with a tubular guide 242 which is coaxial, but external, to the reservoir 21 and in which the plunger 22 is associated so that it can slide.

The plunger 22 comprises a piston 23 which is fixed thereto or integrated therewith, and which can slide with a gas-tight seal along the internal side walls of the reservoir 21 and divides the internal space of the reservoir into the first chamber 21*a* for containing the electrolyte to be transferred to the container C, and into a second chamber 21*b* for containing a gas under pressure (for example air) which is suitable to move, through an expansion thereof, the piston 23 in a direction that expands the volume of the second chamber 21*b* and, simultaneously, decreases the volume of the first chamber 21*a* of the reservoir 21, in this manner making the electrolyte exit from the opening 20. To this end, the plunger 22 comprises an internal coaxial channel 25 which is connected to the second chamber 21*b* and which, at the other end along the axis of the plunger 22, is closed with a one-way valve 28, which can be opened mechanically only in order to introduce or vent the gas in the second chamber 21*b* of the reservoir 21.

The kit formed by the filling unit 2 and by the respective puck 3 also comprises temporary fixing means 27, which are suitable to couple together and render the filling unit 2 and the container C temporarily mutually integral, and more particularly, the filling unit 2 and the puck 3, if any, temporarily mutually integral, and thus form a unitary assembly 4 such as, for example, the one shown in FIG. 8.

The temporary fixing means 27 are preferably associated with each filling unit 2, but they can, alternatively, be provided on the puck 3, if any.

The temporary fixing means 27 can be provided with one or more claws 271, for example with a grapple formed by a plurality of said claws 271 which can be moved closer to/away from each other about the central axis of the filling unit 2.

In other embodiments, not shown, the temporary fixing means can perform the temporary fixing using other snap-acting coupling means, either by interference or friction fit (for example, with a threaded coupling).

The mutual approach and spacing apart between a driving slider 274 and the guide body 24 along an axial direction result in, respectively, the uncoupling and the fixing between the filling unit 2 and the puck 3, i.e. respectively the mutual spacing apart and approach of the hooks 272 of the claws 271 along respective axial planes.

In both its embodiments, the filling apparatus 100, 100' comprises a filling station 13 (such as a filling carousel 130, 130') configured to fill the filling units 2 with electrolyte and a coupling station 14 (such as a coupling carousel 140, 140') configured to couple each filling unit 2 to a respective one of the containers C to form the unitary assembly 4 for transferring the electrolyte from the filling unit 2 to the container C coupled thereto.

The coupling of each filling unit 2 to a respective container C at the coupling station 14 comprises a first substep of alignment between the filling unit 2 and the container C, in which they are aligned and approached to each other, and a second substep of seal connection, in which a fluid-tight connection is created between them. A vacuum can be created in the container C, before transferring the electrolyte.

The filling apparatus 100, 100' also comprises a separation station 12 which is adapted to uncouple each (emptied) filling unit 2 from the respective (filled) container C with which the filling unit 2 had formed the unitary assembly 4. The separation station 12 is preferably a separation carousel 120, 120' which is configured to axially separate the emptied filling units 2 from the respective containers C filled with the predetermined volume of electrolyte.

The filling station 13, the coupling station 14 and the separation station 12 are arranged inside the conditioned room 116, 116'. The first conveyance path P1 of the containers C extends along a first portion located inside the conditioned room 116, 116' (passing along a path from the filling station 13 to the coupling station 14) and along a second portion located at least partially outside the conditioned room 116, 116', passing from the coupling station 14 to the separation station 12, so that the transfer of the electrolyte from the filling unit 2 to the container C coupled thereto can occur at least partially in the environment outside the conditioned room 116, 116'.

Furthermore, the filling apparatus 100', as in the second embodiment, can comprise a sealing carousel 150' which is adapted to plug the inlet 30 of the containers C that was used to fill them with the electrolyte.

Each one of the above-mentioned carousels can rotate, preferably with continuous motion, about a respective central rotation axis, which is preferably vertical for all the carousels.

Each carousel 120, 120', 130, 130', 140, 140' and 150' is advantageously provided with a plurality of grip means which are arranged evenly along its periphery and are adapted to retain, during the rotation of the respective carousel, at least a respective one of the filling units 2 and/or a respective container C or a respective puck 3 that contains a container C.

Advantageously, transfer starwheels are also provided upstream and downstream of each one of the carousel 120, 120', 130, 130', 140, 140' and 150', in order to transfer the conveyed object (filling unit 2, container C-C', unitary assembly 4) from one carousel to another or from one carousel to a linear conveyor or vice versa.

The first conveyance path P1 and the second conveyance path P2 comprise arcs of circumferences traced ideally by the grip means of the carousels and of the transfer starwheels with their rotation about the respective central rotation axes. Arcs of the first and of the second path P1 and P2 are superimposed preferably along the circumferences traced ideally by the grip means of the separation carousel 120, 120' and of the coupling carousel 140, 140'.

Other superimposed segments between the first and the second path P1 and P2 are along the buffer station 110, 110' and along feeding 107, 107' and unloading 108, 108' conveyors for the unitary assemblies 4 to/from the buffer station 110, 110'. Preferably, such feeding and unloading conveyors pass through, for a portion thereof, a tunnel 109, 109' which is connected to a lateral wall of the conditioned room 116, 116' and they pass through this wall at passage openings, each one or all of which have a preset cross-section S2, preferably minimized so as to be able to maintain a modified pressure with respect to the atmospheric pressure inside the conditioned room 116, 116' and optionally inside the tunnel 109, 109'.

The unitary assemblies 4 are transported along a portion of the conveyance path (in which P1 and P2 are superimposed) that exits from the conditioned room 116, 116' and, after having traveled a certain portion outside the conditioned room or dry room 116, 116', reenters such room 116, 116', before the uncoupling operation. Such portion of the conveyance path is preferably arranged in the buffer station 110, 110'.

The buffer station 110, 110' is arranged along a superimposed portion of the paths P1 and P2 which goes from the coupling carousel 140, 140' to the separation carousel 120, 120' and is associated with the feeding 107, 107' and unloading 108, 108' conveyors of the unitary assemblies 4 which respectively feed the unitary assemblies 4 to, and unload them from, the buffer station 110, 110' at the production speed of the filling apparatus 100, 100'.

The buffer station 110, 110' is preferably outside the conditioned room 116, 116'.

The buffer station 110, 110' is an accumulator of the FIFO (First In, First Out) type and can be an accumulation table or an assembly of accumulator conveyors, arranged preferably outside the filling apparatus 100, 100' and outside the conditioned room 116, 116', for example beside or above the filling apparatus 100, 100'. The FIFO accumulator can have one or more moving pads, conveyor belts, motorized roller conveyors or sliding surfaces, optionally arranged so as to form a serpentine route and in any case a route suitable to accumulate a (large) number of unitary assemblies 4 (in particular, N*t unitary assemblies, where N is the production speed of the filling apparatus 100 or 100' in terms of containers C' per minute and t is the time—in minutes—to fill the individual container C with the predetermined volume of electrolyte), by distributing them over an ample surface or making them travel tortuous and/or lengthened paths in order to make them remain in the buffer station 110, 110' for the length of time necessary for the containers C of the unitary assemblies 4 to be filled with the respective predetermined volume of electrolyte.

The unitary assemblies 4 arrive at the buffer station 110, 110' preferably continuously, in a neat row and optionally mutually spaced apart with the same pitch as that between the grip means of the carousels of the filling apparatus 100, 100' and between the receptacles of the transfer starwheels.

The buffer station 110, 110' is suitable to advance the unitary assemblies 4 arriving from the feeder conveyor 107, 107' toward the unloading conveyor 108, 108', at a speed and on a path length defined by the time (t) necessary to fill the individual container C with the predetermined volume of electrolyte. Such incoming unitary assemblies 4 each comprise the filling unit 2 filled with the predetermined volume of electrolyte and the container C not yet filled with such volume.

With the pressure exerted by the gas inside the second chamber 21*b*, the volume of electrolyte is slowly transferred to the container C of the unitary assembly 4 which can continue to remain in the buffer station 110, 110' for the entire time necessary to complete the transfer of the volume of electrolyte from the filling unit 2 to the container C of the unitary assembly 4.

By virtue of the buffer station 110, 110', the filling apparatus 100, 100' can operate at high production speeds N (for example, between 100 and 600 containers C per minute), by being able to rapidly fill the filling units 2 with a carousel 130, 130' that has a limited number of grip means and filling nozzles (for example, in the order of a few multiples of ten, for example between 30 and 60). At the buffer station 110, 110' each filling unit 2 will then autonomously fill, in the (longer) time t required by the internal characteristics of the container C and/or by the nature of the electrolyte, the respective container C of the unitary assembly 4, by transferring to the container C over time t (for example 10 minutes) the predetermined volume of electrolyte that the filling unit 2 had received in a much shorter time (for example 5 seconds) from the filling carousel 130, 130'. The filling carousel 130, 130' can, therefore, have a relatively small number of filling nozzles and faucets (for example between 30 and 60).

The chamber 116, 116' is connected, via a delivery pipe 117, 117', to a dehumidification unit 400 which is adapted to generate and inject an ultra-dry air flow into the chamber 116, 116', i.e. an air flow with a controlled humidity percentage of the order of a few percent by volume, for example less than 3 vol. %, more preferably less than 2 vol. % or 1 vol. %, and adapted to maintain a very low dew point, for example at a value of approximately −40° C. or lower (for example, −60° C.).

Models of dehumidification unit offering these performance levels are per se known and, in the case of the invention, they enable a much lower energy consumption than those used in conventional dry rooms measuring tends of thousands of cubic meters in volume. For example, the electric power required by the dehumidification unit 400 for a dry room of around ten cubic meters in volume can be of the order of 30-40 kW.

The dehumidification unit 400 can comprise a drying or adsorbent rotor (typically with a very extended surface) impregnated with a hygroscopic material that absorbs the humidity in the air, which is regenerated with a current of hot air in order to eliminate the humidity accumulated on the rotor.

The flow rate of the ultra-dry air injected into the conditioned room 116, 116' through the delivery pipe 117, 117' is determined on the basis of the value of the higher pressure ΔP1 that it is desired to have in the room 116, 116' with respect to the atmospheric pressure, and by the extents S1 and S2 of the openings for the passage of the containers C and the unitary assemblies 4, respectively, which are on the walls of the conditioned room 116, 116'.

For example, with a volume of the conditioned room 116' of approximately 6 cubic meters and a higher pressure ΔP1 maintained at +15 Pa with respect to atmospheric pressure, the flow rate of the delivery air can approximately be 1150 cubic meters, taking into account the passage openings that are necessarily present on one or more walls of the conditioned room in order to allow the continuous transit of the products processed by the filling apparatus 100, 100'.

A second higher pressure AΔ2 with respect to atmospheric pressure is optionally maintained inside the entrance tunnel 10, 10' as well, and is preferably higher than the higher pressure ΔP1 maintained in the conditioned room 116, 116', in order to contain the flow rate of the air exiting from the room itself which, otherwise, could bother the operators. A difference of a few pascals (for example αP2−ΔP1=5 Pa) between the two higher pressures ΔP2 and ΔP1 can be sufficient.

Preferably, in the tunnels 11, 11' and/or 109, 109' a lower pressure than the pressure present in the environment outside the conditioned room is kept. In particular, a slightly negative pressure is instead maintained with respect to atmospheric pressure, which is of the order of a few pascals (for example, a negative pressure ΔP3 of approximately −5 Pa with respect to atmospheric pressure), so as to create a kind of air barrier that further prevents external contaminants from entering the conditioned room 116, 116' while still allowing a flow of air from outside toward the tunnels 11, 11' and/or 109, 109'. The tunnels 11, 11' and 109, 109' can be connected to pipes or paths 118, 118', 119, 119' for the air to exit toward an aspiration device 115'.

The operation of the invention is evident from the foregoing description.

In the following, features and possible feature combinations of embodiments of the present disclosure are described as a list of items.

Item 1. A battery manufacturing method, comprising an electrode fabrication step (301) and a cell assembly step (302), each of said electrode fabrication and cell assembly steps comprising a plurality of processing steps on one or more elements that will compose the manufactured batteries, each of said processing steps being performed by a respective processing station (310-314, 320-323, 100, 100'), characterized in that at least one of said processing steps is performed within a dry room (116, 116') of the corresponding processing station that performs that processing step.

Item 2. The method according to item 2, wherein said dry room is kept in higher pressure relative to the outside of said dry room.

Item 3. The method according to item 3, wherein said dry room is formed by walls comprising at least one opening for passage from and/or toward the outside of the elements processed at the processing station comprising said dry room.

Item 4. The method according to one or more of items 1-3, wherein a moisture of less than 3 vol. %, preferably less than 2 vol. % or 1 vol. %, and possibly a dew point lower than or equal to −40° C., is maintained in said dry room.

Item 5. The method according to one or more of items 1-4, wherein said dry room (116, 116') is formed by walls fixed to a frame, to a footing or to a table of a processing apparatus of the processing station comprising said dry room.

Item 6. The method according to one or more of items 1-5, wherein said processing step performed in said dry room is a step of filling with electrolyte containers (C) each containing the electrodes of the cell.

Item 7. The method according to item 6, wherein a plurality of filling units (2), each adapted to contain a predetermined volume of electrolyte, are recirculated along a closed path (P2), along a portion of which they are temporarily rendered integral with respective said containers (C) and are conveyed to a separate buffer station (110, 110') to fill said containers (C) autonomously.

Item 8. A battery production line (1) comprising a group of electrode fabrication stations (301) and a group of cell assembly stations (302), each of said groups (301, 302) comprising a plurality of processing stations (310-314, 320-323, 100, 100') performing respective processes on one or more elements that will compose the manufactured batteries, characterized in that at least one of said processing stations comprises a dry room (116, 116') within which the respective process is performed.

Item 9. The line according to item 8, wherein said processing station comprises walls enclosing a station's space defining said dry room, said dry room being connected to a dehumidification unit (400).

Item 10. The line according to item 9, wherein said dehumidification unit (400) is adapted to maintain in said dry room a moisture of less than 3 vol. %, preferably less than 2 vol. % or 1 vol. %, and a dew point lower than or equal to −40° C.

Item 11. The line according to one or more of items 8-10, wherein said dry room (116, 116') is kept at an overpressure with respect to the outside of said dry room.

Item 12. The line according to one or more of items 8-11, wherein at least one of said walls of the dry room comprises at least one opening for the passage, from and/or toward the outside of the dry room (116, 116'), of the elements processed at the processing station comprising said dry room.

Item 13. The line according to one or more of items 8-12, wherein said dry room walls are fixed to a frame, footing or table of a processing apparatus of the processing station comprising said dry room.

Item 14. The line according to one or more of items 8-13, wherein said at least one processing station comprising said dry room is an apparatus or station (100, 100') for filling with electrolyte a container (C) containing the electrodes of the cell.

Item 15. The line according to item 14, wherein said filling apparatus or filling station (100, 100') comprises a plurality of filling units (2), each adapted to contain a predetermined volume of electrolyte, and means for recirculating along a closed path (P2) said filling units (2), along a portion of said closed path (P2) said filling units being temporarily rendered integral with respective said containers (C) and conveyed to a buffer station (110, 110') which is separate from said filling apparatus or filling station (100, 100'), to autonomously fill said containers with said predetermined volume of electrolyte.

Item 16. The line according to one or more of items 8-15, wherein said processing station comprising the dry room is selected from one or more of the following stations: a mixing station (310), a coating station (311), a drying station (312), a compression station (313), a slitting station (314), a stacking or rolling station (320), a terminal connection station (321), a station (322) for inserting the electrodes within respective casings, a station (323) for closing the casings, a filling apparatus or station (100, 100'), a forming station (330), an aging station (331), an end-of-line testing station (332).

Item 17. A method for filling with electrolyte containers (C) containing electrodes for the manufacture of respective cells, characterized in that said filling is performed within a dedicated dry room (116, 116') that is comprised in a filling apparatus or station (100, 100') that performs said filling.

Item 18. The method according to item 17, wherein said dry room is kept in overpressure with respect to the outside of said dry room.

Item 19. The method according to item 17, wherein said dry room is formed by walls comprising at least one opening for the passage, from and/or toward the outside of said filling apparatus or station, of containers (C) to be filled and/or already filled with said electrolyte.

Item 20. The method according to one or more of items 17-19, wherein a moisture of less than 3 vol. %, preferably less than 2 vol. % or 1 vol. %, and a dew point lower than or equal to −40° C. is maintained in said dry room.

Item 21. The method according to one or more of items 17-20, wherein said dry room (116, 116') is formed by walls fixed to a frame, footing, or table of a filling apparatus which constitutes the filling apparatus comprising said dry room.

Item 22. The method according to one or more of items 17-21, wherein multiple filling units (2), each adapted to contain a predetermined volume of electrolyte, are recirculated along a closed path (P2), along a portion of which said filling units (2) are temporarily rendered integral with respective said containers (C) and are conveyed to a separate buffer station (110, 110') to fill said containers (C) autonomously.

Item 23. A station for filling with electrolyte containers (C) for batteries, comprising an inlet (10, 10') for empty containers (C), an outlet (11, 11') for the containers (C) filled with the electrolyte, and a first path (P1) for the conveyance of the containers between said inlet (10, 10') and said outlet (11, 11'), characterized in that said filling apparatus or filling station comprises a dry room (116, 116') within which the respective process is performed.

Item 24. The filling apparatus or filling station according to item 23, comprising walls enclosing a space of the station that forms said dry room, which is connected to a dehumidification unit (400).

Item 25. The filling apparatus or filling station according to item 24, wherein said dehumidification unit (400) is adapted to maintain in said dry room a moisture of less than 3 vol. %, preferably less than 2 vol. % or 1 vol. %, and a dew point lower than or equal to −40° C.

Item 26. The filling apparatus or filling station according to one or more of items 23-25, wherein said dry room (116, 116') is kept in overpressure with respect to the outside of said dry room.

Item 27. The filling apparatus or filling station according to one or more of items 23-26, wherein at least one of said dry room walls comprises at least said inlet (10, 10') and said outlet (11, 11').

Item 28. The filling apparatus or filling station according to one or more of items 23-27, wherein said dry room walls are fixed to a frame, footing or table of the processing apparatus constituting the filling apparatus.

Item 29. The filling apparatus or filling station according to one or more of items 23-28, characterized in that it further comprises:

a second path (P2) for the conveyance of a series of filling units (2), said first and second paths (P1, P2) being at least partly mutually overlapping;

a separation carousel (120, 120'), a filling carousel (130, 130') of said filling units (2), a coupling carousel (140, 140');

wherein a buffer station (110), which is preferably external to said dry room, is crossed by said first path (P1) from said coupling carousel to said separation carousel, wherein said filling carousel (130) is adapted to introduce into each of said filling units (2) a predetermined volume of the electrolyte to be injected into said containers (C);

wherein said coupling carousel (14) is adapted to temporarily fix to each of said containers (C) a respective one of said filling units (2) that arrive from said filling carousel (130), so as to form a unitary assembly (4) in which the filling unit (2) and the respective container (C) are in fluid communication;

each of said filling units being adapted to autonomously transfer said predetermined volume of electrolyte to said container of the respective unitary assembly (4);

said separation carousel (120, 120') being adapted to disassemble said unitary assemblies (4) that exit from the buffer station (110, 110'), separating the emptied filling units (2) of each unitary assembly (4) from the respective filled containers (C).

In practice it has been found that the invention fully achieves the intended aim and objects.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102022000021240 from which this application claims priority are incorporated herein by reference.

Where technical features mentioned in any claim are followed by reference signs, such reference signs have been inserted for the sole purpose of increasing the intelligibility of the claims and accordingly such reference signs do not have any limiting effect on the interpretation of each element identified by way of example by such reference signs.

The invention claimed is:

1. A method of filling containers of electrochemical cells with electrolyte, said method comprising the steps of:

providing a plurality of filling units each one of which is adapted to contain a predetermined volume of electrolyte;

filling each filling unit with said electrolyte; subsequently coupling each filling unit to a respective one of said containers, thus forming a unitary assembly for transferring the electrolyte from the filling unit to the container coupled thereto; subsequently transferring said electrolyte from the filling unit to the container coupled thereto, and subsequently uncoupling each filling unit from the respective container with which it had formed the unitary assembly, wherein said steps of coupling and uncoupling are performed inside a conditioned room delimited by walls that separate an environment inside the conditioned room from an environment outside the conditioned room, the pressure and/or humidity conditions of the environment inside the conditioned room being different from the outside environment, and in that the step of transferring said electrolyte from the filling unit to the container coupled thereto occurs at least partially in the environment outside the conditioned room.

2. The method according to claim 1, wherein after the step of coupling, the unitary assemblies are transported along a conveyance path that exits from the conditioned room and, after having traveled outside the conditioned room, reenters the conditioned room, before the step of uncoupling.

3. The method according to claim 1, wherein during the step of transferring said electrolyte from the filling unit to the container coupled thereto, said unitary assemblies are conveyed to a buffer station outside said conditioned room.

4. The method according to claim 1, wherein said walls of the conditioned room are provided with an entrance and an exit which are configured and dimensioned in order to allow entrance of the containers to be filled and exit of the containers filled with electrolyte, respectively.

5. The method according to claim 4, wherein said containers to be filled enter the conditioned room by passing through an entrance tunnel which is kept at a higher pressure than the pressure kept in the conditioned room.

6. The method according to claim 4, wherein said filled containers when exiting from the conditioned room pass through an exit tunnel which is kept at a pressure lower than the pressure present in the environment outside the conditioned room.

7. The method according to claim 1, wherein said conditioned room is kept at a higher pressure than the outside environment.

8. The method according to claim 1, wherein inside said conditioned room a relative humidity is maintained which is less than 3%.

9. The method according to claim 1, wherein inside said conditioned room a dew point is maintained which is less than or equal to −40° C.

10. The method according to claim 1, wherein said step of coupling each filling unit to a respective one of said containers comprises a first substep of alignment between the filling unit and the container, in which they are aligned to each other, and a second substep of seal connection, in which a fluid-tight connection is created between them, and in which after the first substep of alignment and before the second substep of seal connection, a vacuum is created in the container, said vacuum being further created before the step of transferring the electrolyte.

11. The method according to claim 1, wherein said step of filling each filling unit with said electrolyte is accomplished inside said conditioned room.

12. The method according to claim 1, wherein each filling unit comprises a syringe-like unit with a reservoir having an opening for the passage of the electrolyte, said opening being connectable to an inlet of the container, and in which a piston which can move within the reservoir is configured to transfer the electrolyte from the reservoir into the container.

13. The method according to claim 1, further comprising a step of accommodating each of said containers in a respective transport puck before the step of coupling each filling unit to each container.

14. A method of producing batteries, comprising a step of manufacturing electrodes and a step of assembling cells, said step of assembling cells comprising a plurality of processing steps, wherein one step of said plurality of processing steps comprises a method of filling according to claim 1.

15. A line for filling containers of electrochemical cells with electrolyte, comprising:

a conveyance path of the containers;

a filling station configured to fill filling units with said electrolyte;

a coupling station configured to couple each filling unit to a respective one of the containers, thus forming a unitary assembly for transferring the electrolyte from the filling unit to the container coupled thereto;

a separation station configured to uncouple, after transferring electrolyte to the container, each filling unit from the respective container, further comprising a conditioned room delimited by walls that separate an environment inside the conditioned room from an environment outside the conditioned room, the pressure and/or humidity conditions of the environment inside the conditioned room being different from the outside environment, wherein said filling station, said coupling station and said separation station are arranged inside said conditioned room, and wherein said conveyance path of the containers extends along a first portion located inside the conditioned room, passing from the filling station to the coupling station, and along a second portion located at least partially outside the conditioned room, passing from the coupling station to the separation station, so that transfer of said electrolyte from the filling unit to the container coupled thereto can occur at least partially in the environment outside the conditioned room.

16. The filling line according to claim 15, further comprising a buffer station which is arranged outside the conditioned room and is passed through by the second portion of said conveyance path of the containers.

* * * * *